No. 879,178. PATENTED FEB. 18, 1908.
C. R. KELLY.
PROPORTIONAL CALCULATING MACHINE.
APPLICATION FILED JUNE 20, 1907.
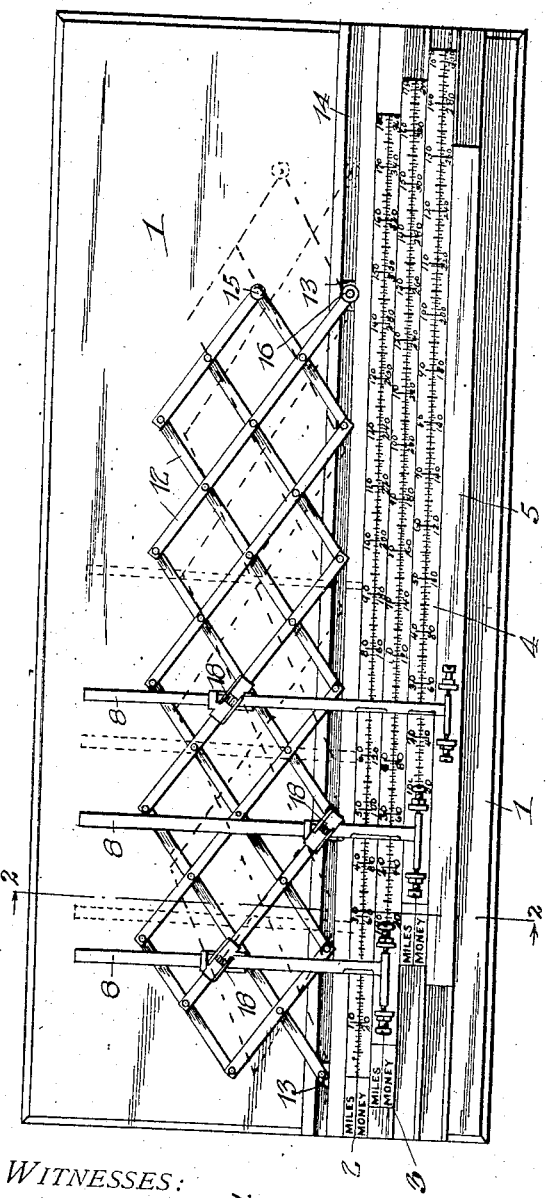
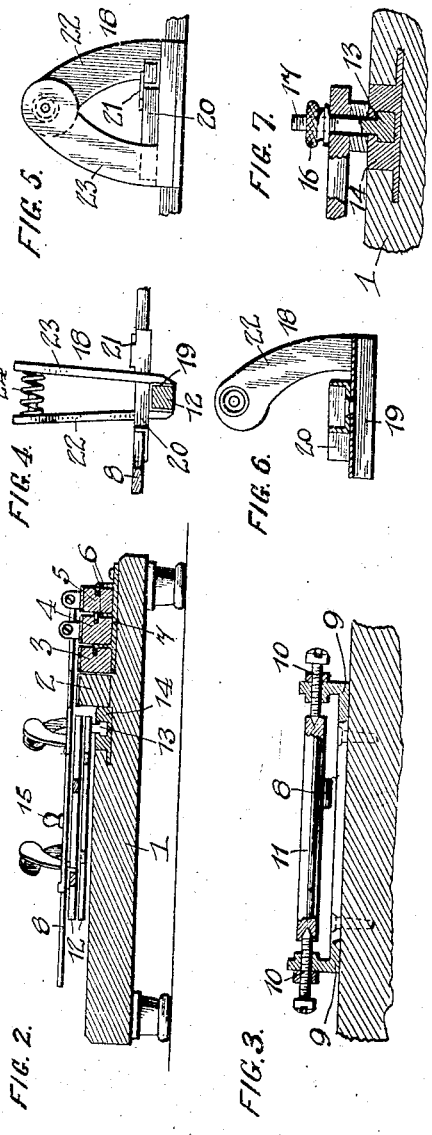
WITNESSES:
Chas. K. Davis
Myron G. Clean
INVENTOR
Charles R. Kelly,
BY
C. L. Parker
Attorney

UNITED STATES PATENT OFFICE.

CHARLES R. KELLY, OF LOUISVILLE, KENTUCKY.

PROPORTIONAL-CALCULATING MACHINE.

No. 879,178.　　　Specification of Letters Patent.　　　Patented Feb. 18, 1908.

Application filed June 20, 1907. Serial No. 379,899.

*To all whom it may concern:*

Be it known that I, CHARLES R. KELLY, a citizen of the United States, residing at Louisville, in the county of Jefferson and State of Kentucky, have invented certain new and useful Improvements in Proportional-Calculating Machines, of which the following is a specification.

My invention relates broadly to calculating machines and more particularly to a machine or device for proportionally calculating divisions of rates and the like.

In a railroad office it is very frequently necessary to divide passenger and other rates between several lines over which tickets may be sold or freight forwarded, and it is the object of my invention to provide a proportional calculating machine which will obviate the necessity of the immense amount of mental calculations involved in the above process.

My invention resides specifically in the following features of construction, arrangement and operation as will be hereinafter described with reference to the accompanying drawings in which like numerals are used to indicate like parts throughout the several figures, and in which, Figure 1 is a plan view of my improved device, Fig. 2 is a vertical sectional view therethrough on the line 2—2 of Fig. 1, Fig. 3 is a detail sectional view of the hinged mounting of the indicator arms, Figs. 4 and 5 are, respectively, end and side elevations of the indicator on the clamping device, Fig. 6 is a vertical sectional view taken therethrough, and Fig. 7 is a detail sectional view of the adjustable guide clamp for the proportional actuator.

In the practical embodiment of my invention I provide a suitable board 1 on which is mounted a stationary scale 2 and movable scales 3, 4 and the movable slide 5, said movable scales being provided with a longitudinal side opening within which the angular arm 6 of the metallic plate 7 is mounted on the board 1, engaged to prevent displacement of said scales while allowing longitudinal movement of the same with relations to the board 1.

The stationary and movable scales are each divided centrally and longitudinally to form side divisions, each of which are separately graduated in such manner that the graduations of the "money" divisions are twice the value to those of the "miles" division. The movable scales are slidably arranged upon the board 1 in juxtaposition with themselves and the stationary scale 2, the slide 5 not being graduated nor marked for the reason that it is unnecessary.

Each of the slides 3, 4 and 5 are provided with an indicator arm 8 extending from its respective scale-bar at the zero point thereof and swingingly adjustably mounted thereon within a yoke frame 9, having adjusting screws 10 pivotally projecting through the extensions thereof and engaging a lateral piece 11 to which said arm 8 is connected. The indicator arms are arranged to lie across the face of the stationary scale 2 and the intervening movable scales, if there are such, and extend uniformly outwardly across the face of the board 1. The idea, according to my invention, is to move the indicator arms 8 and their respective scale-bars proportionally with one another, and to do this I provide a lazy tongs 12 to which said arms are detachably connected and which may be actuated upon the face of the board 1 longitudinally thereof, its ends having guide blocks 13 mounted within a guide channel 14 of said board 1. The lazy tongs 12 are provided with an upwardly projecting stud 15 constituting a handle and may be locked in a desired degree of adjustment or actuation by means of the thumb screw 16 engaging upon a threaded stud 17 projecting upwardly from the guide block 13 at one end thereof.

The means for detachably securing the indicator arms 8 to the lazy tongs 12 comprise a clamping member 18, and said clamping member comprises a resilient channel member 19 adaptable for adjustment upon any one of the levers constituting the lazy tongs 12, and above which is pivotally swingingly connected a second channel member 20 through which the indicator arm 8 is slidably held, and prevented from removal therefrom by a bridge piece 21. Extending upwardly from opposite sides of the resilient channel piece 19 at opposite ends thereof are the handle members 22 and 23 curved inwardly to a point central above said channel piece 19 and provided with coil spring 24 arranged between their upper ends and normally spreading the same apart. It will thus be seen that in clamping the channel piece 19 upon one of the levers of the lazy tongs 12 I depend entirely upon the resiliency of said channel piece, and in removing the same I spread the sides thereof by forcing the upper ends of the handle members 22 and 23 toward one another against the tension of spring 24.

The principle of operation of my invention I have illustrated in Fig. 1 by a dotted position of the lazy tongs and indicator arms, it being noted that the arms 8, as shown in full lines, are set at 20, 44 and 68 of the stationary scale 2 and that the same when expanded are brought respectively to 27, 59 and 91 of said stationary scale, being thus moved while maintaining exactly, the same relative distance between themselves from the beginning of the scale. To further illustrate the use of my invention, I will describe the same in its most common application. In this illustration I will say a rate of $2.22 applies between two certain points 74 miles distant and over three lines of railroad. The present method is to first find the rate per mile by dividing the total number of miles into the amount and multiplying the rate per mile by the number of miles for each road. "A" is 13 miles, "B" 35 miles and "C" 26 miles. To work out these divisions I would set the first indicator arm at 13 miles, the second at 35 miles beyond the first and the third at 26 miles beyond the second, thus bringing into use the scales upon the movable scale-bars. Having done this I will then expand the lazy tongs until the last pointer is on $2.22 of the first scale, and when resting so the different indicator arms will show exactly the various amount for the different roads, "A" getting 39 cents, "B" $1.05 and "C" 78 cents, making the total correct. It will be understood that although I have shown in the accompanying drawing a construction well adapted to perform the functions set forth and the practical operation of the same, I will construct the same upon a greatly enlarged scale and will otherwise change such details of the construction as fall within the terms of the following claims.

Having thus fully described my invention, I claim:

1. In a proportional calculator, the combination of a plurality of movable scale bars, a lazy tongs for simultaneously moving said scale bars while maintaining their same relative distance, and means for adjustably, slidably connecting said scale bars to said lazy tongs.

2. In the proportional calculator, the combination of a plurality of movable scale-bars, mechanism for simultaneously moving said scale-bars while maintaining their same relative distance, and means for adjustably connecting said scale-bars to said mechanism, substantially as described.

3. In a proportional calculator, the combination of a plurality of movable scale bars, a lazy tongs for simultaneously moving said scale bars while maintaining their same relative distance, and clips adjustable within said lazy tongs for the reception of a portion of said scale bars slidably therein.

4. In the proportional calculator, the combination of a stationary scale, a plurality of movable scales arranged adjacent said stationary scale and provided with indicator arms extending thereupon across the face of said stationary scale and a lazy tongs to which said arms are attachable, for moving said arms and their respective scale-bars, while maintaining the same relative position to the arms to each other and to the beginning of the scale, substantially as described.

5. In the proportional calculator, the combination of a stationary scale, a plurality of movable scales indicator arms extending from said movable scales across said stationary scale, a lazy tongs for moving said movable scales, and clamping members for connections within said lazy tongs and arranged to slidably receive said indicator arms, substantially as described.

6. In the proportional calculator, the combination of a stationary scale, a plurality of movable scales, indicator arms extending from said movable scales across said stationary scales, a lazy tongs to which said arms are attachable for moving the same, and means for locking said lazy tongs in a selected degree of adjustment, substantially as described.

7. In the proportional calculator, the combination of a stationary scale, movable scales arranged adjacent thereto, indicator arms swingingly pivotally connected to said movable scales and extending across said stationary scale, a lazy tongs to which said arms are adjustably connected, for moving the same, and said movable scales, substantially as described.

8. In the proportional calculator, the combination of a stationary scale, movable scales arranged adjacent thereto, indicator arms pivotally swingingly mounted upon said movable arms and arranged across said stationary scale, a lazy tongs for moving said arms and their respective scales in a relatively similar adjustment, attachable clamping members arranged for connection within said lazy tongs and adapted to receive said arms slidably therein, and means for locking said lazy tongs in a selected degree of adjustment, substantially as described.

In testimony whereof I affix my signature in presence of two witnesses.

CHARLES R. KELLY.

Witnesses:
J. D. GIBBS,
C. W. EAKEN.